United States Patent [19]

Twerdochlib

[11] Patent Number: 4,987,555
[45] Date of Patent: Jan. 22, 1991

[54] TURBINE BLADE SHROUD CLEARANCE MONITOR

[75] Inventor: Michael Twerdochlib, Oviedo, Fla.

[73] Assignee: Westinghouse Electric Corp., Pittsburgh, Pa.

[21] Appl. No.: 277,833

[22] Filed: Nov. 30, 1988

[51] Int. Cl.$^5$ .............................................. G01B 7/14
[52] U.S. Cl. ................................... 364/561; 364/508; 324/207.11
[58] Field of Search ............... 324/243, 239, 224, 202, 324/207.11, 207.12; 73/660; 364/561, 560, 508, 571.01

[56] References Cited

U.S. PATENT DOCUMENTS

| | | | |
|---|---|---|---|
| 3,034,043 | 5/1962 | Dega | 73/160 |
| 3,707,671 | 12/1972 | Marrow et al. | 324/224 |
| 3,929,008 | 12/1975 | Zlotin et al. | 73/660 |
| 4,173,869 | 11/1979 | Martin, Jr. et al. | 60/646 |
| 4,518,917 | 5/1985 | Oates et al. | 324/207 |
| 4,596,952 | 6/1986 | Goff et al. | 324/207 |
| 4,795,278 | 1/1989 | Hayashi | 324/208 X |
| 4,797,611 | 1/1989 | Schrieber | 324/208 |

FOREIGN PATENT DOCUMENTS 0135703 10/1980 Japan.

Primary Examiner—Gary Chin
Assistant Examiner—S. A. Melnick

[57] ABSTRACT

A system for monitoring the clearance between a plurality of turbine blade shroud segments connected to form a turbine blade shroud and the stationary portion of the turbine comprises a sensor responsive to eddy currents generated in each of the shroud segments for producing input signals representative of the clearance between each shroud segment and the stationary portion of the turbine. Indicia are carried by the turbine blade shroud for causing the sensor to produce a known displacement signal. A processor is responsive to the input signals and the displacement signal for producing output signals indicative of the clearance between each shroud segment and the stationary portion of the turbine. The output signals have a predetermined relationship to the known displacement signal.

10 Claims, 3 Drawing Sheets

TURBINE BLADE SHROUD CLEARANCE MONITOR

BACKGROUND OF THE INVENTION

1. Field of the Invention

The present invention is directed generally to systems for monitoring the operating parameters of a steam turbine generator and, more particularly, to systems for monitoring the clearance between the fixed and rotating parts within the turbine.

2. Cross Reference to Related Applications

The present application is related to U.S. Application Serial No. 277,832 entitled Turbine Blade shroud Temperature Monitor filed and assigned to the same assignee as the present invention. (WE Case no. 54,472)

3. Description of the Prior Art

Most turbine blade rows are shrouded to provide some measure of sealing between the stationary and rotating portions of the turbine. Shroud segments are arc-shaped structures connected in series to form a circular shroud around the tips of the blades in a blade row. Each shroud segment is typically riveted to three or more blade tips. Thus, a number of shroud segments are needed to completely encircle a row of blades.

The clearance between the stationary seal of the turbine and the shroud segments must not be so great as to allow an excessive amount of steam to pass between them and thereby reduce the efficiency of the turbine. On the other hand, clearances cannot be too small because highcentripetal loading and high temperatures may cause shroud segments to lift or grow radially. Such shroud lifting or radial growth can cause shroud segments to rub the stationary seal and may eventually cause seal, shroud, and blade damage. Thus, it is desirable to monitor the clearance between the shroud segments and the stationary seal to prevent damage to the turbine.

A system for monitoring such clearances is disclosed in U.S. Patent Application Serial No. 199,633 entitled Turbine Blade Shroud Clearance Monitor filed 27 May 1988 and assigned to the same assignee as the present invention. (WE case no. 54,160) The invention disclosed in that application uses a non-contact type of sensor to produce a signal representative of the distance between each shroud segment and the stationary portion of the turbine. The signals thus produced may be processed in a number of different ways, e.g. comparing the average clearance value of each shroud segment to the average clearance values of the two adjacent shroud segments, comparing the average clearance value of each shroud segment to the average row clearance value, comparing the average clearance value of each shroud segment to a predetermined critical value, etc. However, the system may suffer from unknown effects caused by varying temperatures, varying rotor speeds, and the use of different types of metals in the construction of the rotating portion of the turbine. Thus, the need exists for a shroud clearance monitoring system which is immune to such unknown effects.

SUMMARY OF THE INVENTION

The present invention is directed to a system for monitoring the clearance between a plurality of turbine blade shroud segments connected to form a turbine blade shroud and the stationary portion of the turbine. The present invention comprises a sensor responsive to eddy currents generated in each of the shroud segments for producing input signals representative of the distance between each shroud segment and the stationary portion of the turbine in which the sensor is mounted. Indicia are carried by the turbine blade shroud for causing the sensor to produce a known displacement signal. A processor is responsive to the input signals and the displacement signal for producing output signals indicative of the distance between each shroud segment and the stationary portion of the turbine. The output signals have a predetermined relationship to the known displacement signal.

According to one embodiment of the present invention the indicia are a plurality of closely spaced 100 mil (2.54 mm) deep slits formed in the surface of one of the shroud segments. The output signals are measured in units equal to the displacement signal produced by the slits.

According to another embodiment of the present invention the indicia is a step gap formed between adjacent shroud segments.

According to another embodiment of the present invention the indicia is a notch filled with nonmagnetic material.

The present invention also includes a method for monitoring the clearance between a plurality of turbine blade shroud segments forming a turbine blade shroud and a stationary portion of the turbine. The method includes the steps of sensing eddy currents generated in each of the shroud segments to produce input signals representative of the distance between each shroud segment and the stationary portion of the turbine. Eddy currents generated by indicia carried by the turbine blade shroud are sensed to produce a known displacement signal. The input signals and the displacement signal are processed to produce output signals indicative of the distance between each shroud segment and the stationary portion of the turbine. The output signals have a predetermined relationship to the known displacement signal.

The monitoring system of the present invention is said to be an auto-calibration type of system because the output signals are expressed in terms of a known displacement signal produced by the system. That auto-calibration feature makes the system of the present invention immune to unknown effects caused by, for example, varying temperatures, varying rotor speeds, and the use of different metals in the construction of the rotation portion of the turbine. These and other advantages and benefits of the present invention will become apparent from the Detailed Description of Preferred Embodiments hereinbelow.

BRIEF DESCRIPTION OF THE DRAWINGS

In order for the present invention to be clearly understood and readily practiced, preferred embodiments will be described, by way of example only, with reference to the accompanying figures wherein.

DETAILED DESCRIPTION OF PREFERRED EMBODIMENTS

Figure 1:
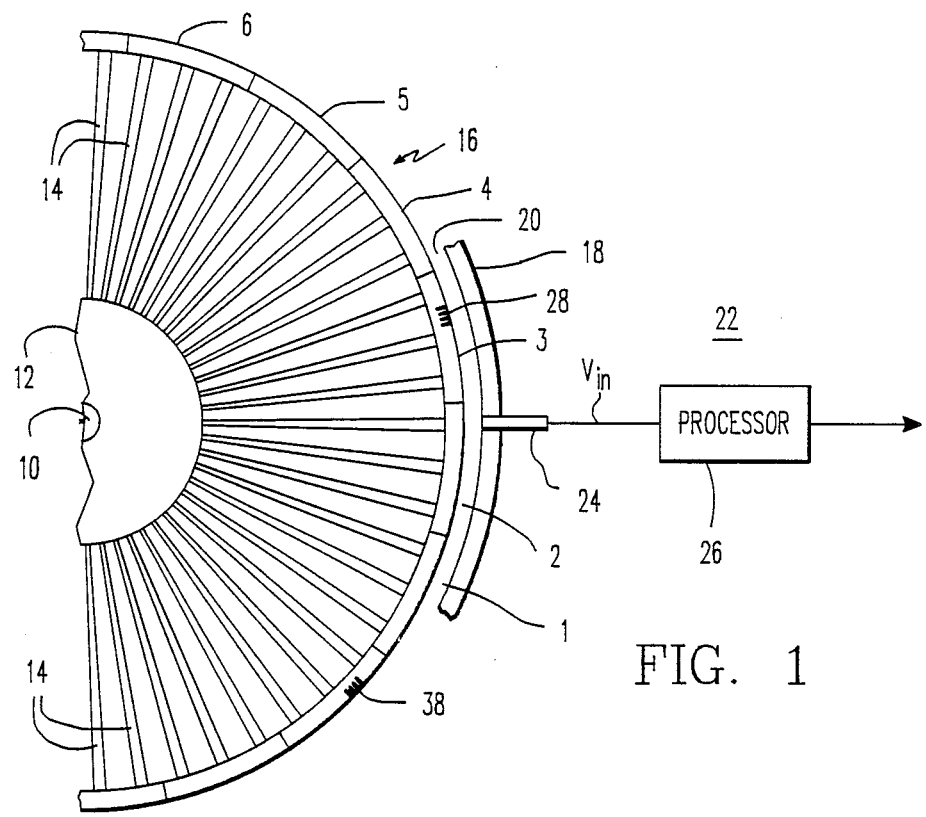
FIG. 1 illustrates a steam turbine having a shroud clearance monitor utilizing the auto-calibration feature of the present invention.

FIG. 1 illustrates a portion of a steam turbine generator utilizing a shroud clearance monitor having the auto-calibration feature of the present invention. In FIG. 1 a rotor 10 carries a rotor disc 12 to which are attached a plurality of turbine blades 14. Typically, three or more turbine blades may be connected to a shroud segment as shown by shroud segments 1 through 6. The shroud segments are serially connected to form a continuous shroud 16 encircling the plurality of turbine blades. The rotor 10, rotor disc 12, plurality of turbine blades 14, and shroud 16 make up a part of the rotating portion of the turbine.

A stationary seal 18 is positioned between the rotating portion of the turbine and the stationary portion of the turbine. A clearance 20 between the rotating portion of the turbine and the seal 18 is monitored by a shroud clearance monitor 22.

Figure 3A:
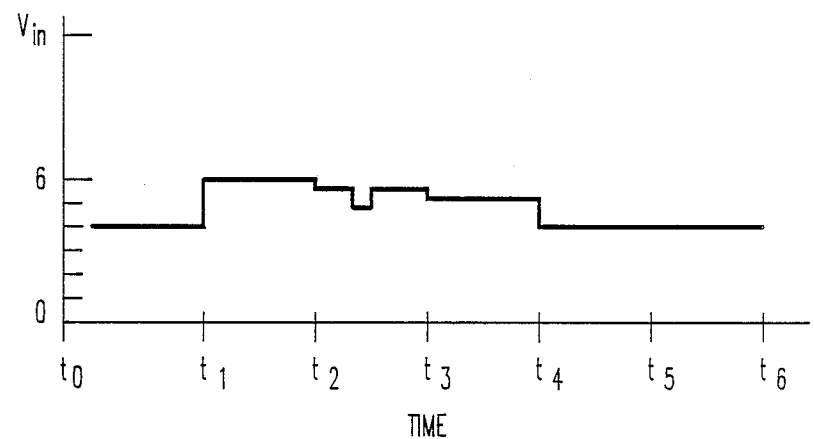
FIGS. 3A and 3B are graphs illustrating signals input to and output from, respectively, the processor shown in FIG. 1.

The clearance monitor 22 is comprised of two major components, a sensor 24 and a processor 26. The sensor 24 may be any type of known sensor which produces, for example, an input signal Vin of the type illustrated in FIG. 3A in response to eddy currents generated in each shroud segment. The processor 26 may be any known type of processor capable of receiving the input signal Vin and extracting therefrom information regarding the clearance 20. An example of such a processor is disclosed in U.S. Patent Application Serial No. 199,633 filed 27 May 1988 and assigned to the same assignee as the present invention (WE case no. 54,160). The reader desiring more details regarding the construction and operation of the processor 26 is directed to the aforementioned patent application which is hereby incorporated by reference.

Figure 2:
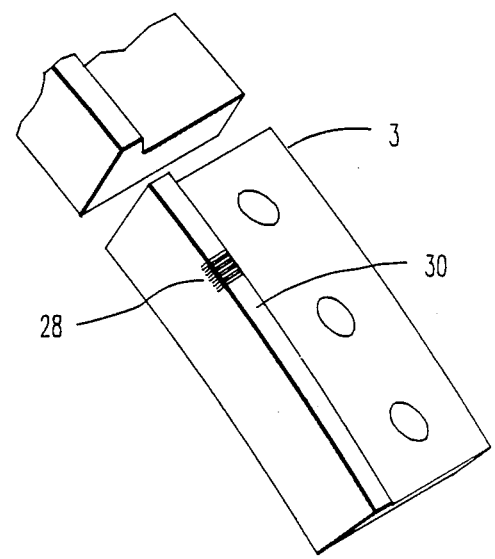
FIG. 2 illustrates one type of indicia carried by the turbine blade shroud.

The present invention employs indicia carried by the shroud 16. In the embodiment shown in FIG. 1, the indicia may include a series of closely spaced slits 28, shown in greater detail in FIG. 2, cut into the measuring surface 30 of shroud segment 3. The slits 28 respond as a notch to the eddy current sensor 24 and cause the production of a signal representative of a known displacement which can be used for calibration purposes as will be more fully described hereinbelow. A notch cut into the shroud 16 would provide the same capability but the slits provide a barrier to steam leakage and are more easily placed into the shroud segments in the field. In one embodiment the slits may be 100 mils (2.54 mm) deep, be spaced apart by 64 mils (1.64 mm) center to center, and be spread over a distance of 1000 mils (24.4 mm).

As stated above, the sensor 24 produces an input signal Vin in response to the eddy currents generated in each shroud segment. The input signal Vin is representative of the clearance 20 between each shroud segment and the stationary portion of the turbine. The input signal may be of the type shown in FIG. 3A wherein the signal produced by the sensor 24 in response to the eddy currents in shroud segment 1 is illustrated from time t0 to time t1, the signal produced by sensor 24 in response to the eddy currents in shroud segment 2 is illustrated from time t1 to time t2, etc. Thus, the signals generated as shroud segments 1 through 6 rotate past sensor 24 may be four volts, six volts, five and one-half volts, five volts, four volts, and four volts, respectively.

Shroud segment 3 has an additional signal, the calibration signal, produced as a result of the indicia carried by the shroud 16, in this case the 100 mil (2.54 mm) slits. That calibration signal has a magnitude of one volt. Thus, regardless of the magnitude of the signal generated by the shroud segment 3, whatever the magnitude of the calibration signal, that magnitude will be representative of the depth of the slits. In our example, the one volt calibration signal is equal to 100 mils (2.54 mm). Now that we know one volt is equal to 100 mils (2.54 mm), the signals produced by that shroud segment and the other shroud segments can be expressed by processor 26 in terms of the calibration signal as shown in FIG. 3B.

Figure 3B:
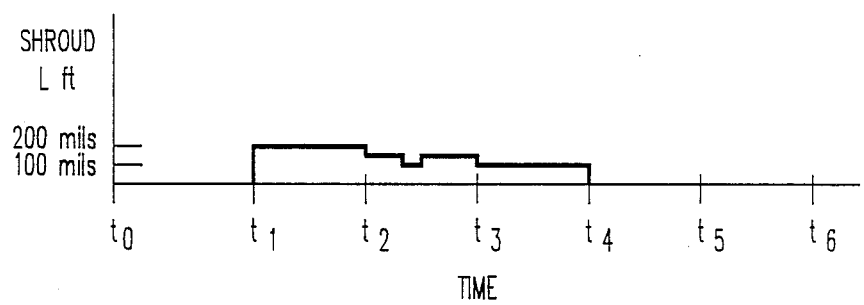

In FIG. 3B the processor may use the smallest input signal as a reference. In our example, the signals generated by shroud segments 1, 5, and 6 were all four volts. Thus, those shroud segments are considered to have zero lift. The signal for shroud segment 2 is two volts larger than the signal for the reference shroud segment. Two volts is twice as large as the one volt calibration signal so shroud segment 2 must have a lift of 200 mils (5.08 mm). The signal for shroud segment 3 is one and one-half volts larger than the signal for the reference shroud segment. That is one and one-half times larger than the calibration signal so shroud segment 3 has a lift of 150 (3.81 mm). Similarly, shroud segment 4 can be seen to have a lift of 100 mils (2.54 mm).

By expressing the signals generated by each shroud segment in terms of a calibration signal representative of a known displacement, unknown effects caused by varying temperatures, varying rotor speed, and metal type are elimated. The auto-calibration feature of the present invention represents an advance over the art by immunizing clearance monitors from unknown undesirable effects.

Figure 4:
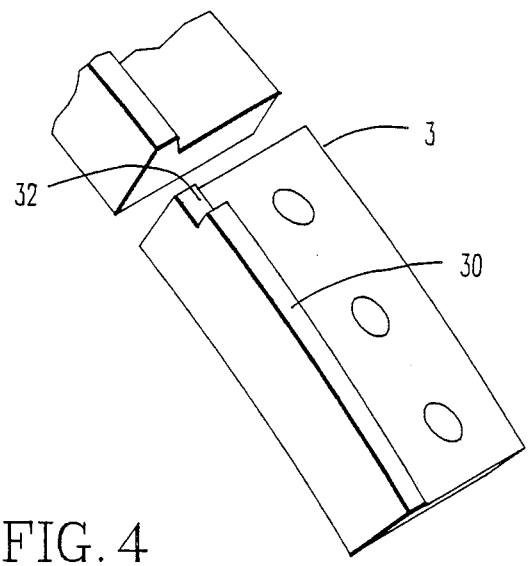
FIGS. 4 and 5 illustrate other types of indicia carried by the turbine blade shroud.
Figure 5:
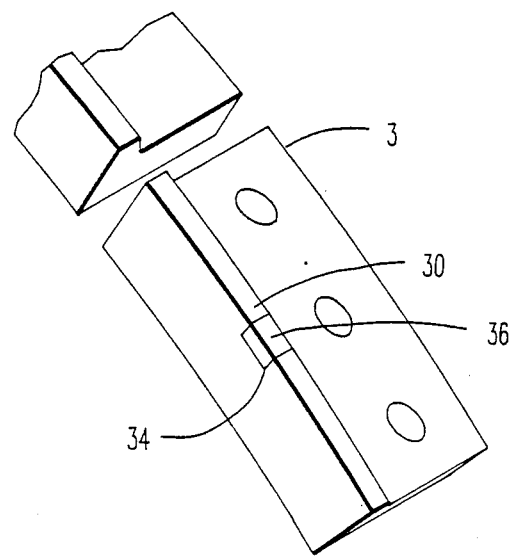

Other embodiments of the present invention contemplate the use of more than one indicia carried by the shroud 16 as shown by indicia 38 in FIG. 1, indicia formed by a step gap 32 positioned where adjacent shroud segments abut as shown in FIG. 4, and a notch 34 filled with a material 36 in which it is difficult to induce eddy currents as shown in FIG. 5.

The present invention also includes a method for monitoring the clearance between a plurality of turbine blade shroud segments forming a turbine blade shroud and a stationary portion of the turbine. The method includes the steps of sensing eddy currents generated in each of the shroud segments to produce input signals representative of the distance between each shroud segment and the stationary portion of the turbine. Eddy currents generated by indicia carried by the turbine blade shroud are sensed to produce a known displacement signal. The input signals and the displacement signal are processed to produce output signals indicative of the distance between each shroud segment and the stationary portion of the turbine. The output signals have a predetermined relationship to the known displacement signal.

While the present invention has been described in terms of preferred embodiments thereof, it is anticipated that modifications and variations will be apparent to those of ordinary skill in the art. This disclosure and the following claims are intended to cover all such modifications and variations.

What I claim is:

1. A system for monitoring the clearance between a plurality of turbine blade shroud segments forming a turbine blade shroud and a stationary portion of the turbine, comprising;

sensor means responsive to eddy currents generated in each of the shroud segments for producing input signals representative of the clearance between each said shroud segment and the stationary portion of the turbine;

indicia means of known dimension carried by the turbine blade shroud for causing said sensor means to produce a calibration signal representative of said known dimension of said indicia means; and processing means responsive to said input signals and said calibration signal for producing output signals indicative of the clearance between each said shroud segment and the stationary portion of the turbine, said output signals having a predetermined relationship to said calibration signal.

2. The system of claim 1 wherein said indicia means includes a plurality of slits formed in the surface of one of the shroud segments.

3. The system of claim 2 wherein each of said slits is approximately 100 mils deep and wherein said output signals are expressed in units equal to the magnitude of said calibration signal.

4. The system of claim 1 wherein said indicia means includes a notch formed in the surface of one of the shroud segments, said notch being filled with a nonconducting material.

5. The system of claim 1 wherein said indicia means includes a step gap between adjacent ones of the shroud segments.

6. A steam turbine having a system for monitoring the clearance between a plurality of turbine blade shroud segments forming a turbine blade shroud and a stationary portion of the turbine, comprising:

a rotor;

said row of turbine blades carried by said rotor;

said plurality of turbine blade shroud segments carried on the ends of said turbine blades so as to form said turbine blade shroud;

a stationary seal surrounding said turbine blade shroud for reducing the amount of steam passing around said turbine blades;

sensor means positioned in said seal, said sensor means being responsive to eddy currents generated in each of said shroud segments for producing input signals representative of the clearance between each shroud segment and said stationary seal;

indicia means of known dimension carried by said turbine blade shroud for causing said sensor means to produce a calibration signal representative of said known dimension of said indicia means; and processing means responsive to said input signals and said calibration signal for producing output signals indicative of the clearance between each said shroud segment and said stationary seal, said output signals having a predetermined relationship to said calibration signal.

7. The steam turbine of claim 6 wherein said indicia means includes a plurality of slits formed in the surface of one of said shroud segments.

8. The steam turbine of claim 6 wherein said indicia means includes a step gap between adjacent ones of the shroud segments.

9. The steam turbine of claim 6 wherein said indicia means includes a notch formed in the surface of one of said shroud segments, and wherein said notch is filled with a nonconducting material.

10. A method for monitoring the clearance between a plurality of turbine blade shroud segments forming a turbine blade shroud and a stationary portion of the turbine, comprising the steps of:

sensing eddy currents generated in each of the shroud segments to produce input signals representative of the clearance between each said shroud segment and the stationary portion of the turbine;

sensing eddy currents generated by indicia means of known dimension carried by the turbine blade shroud to produce a calibration signal representative of said known dimension of said indicia means; and processing said input signals and said calibration signal to produce output signals indicative of the clearance between each said shroud segment and the stationary portion of the turbine, said output signals having a predetermined relationship to said calibration signal.

\* \* \* \* \*